J. H. Smith,
Hollow Auger.
Nº 56,459.  Patented July 17, 1866.
Fig: 1.
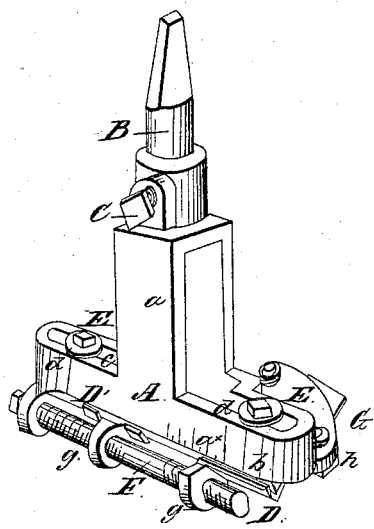
Fig: 2.
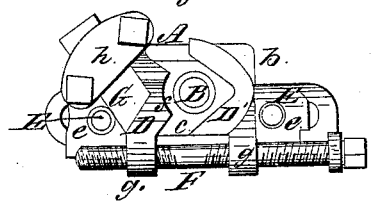
Fig: 3.
Witnesses:
Inventor:
J. H. Smith
Per Munn & Co
Attorneys

United States Patent Office.

J. H. SMITH, OF PINEVILLE, PENNSYLVANIA.

IMPROVEMENT IN HOLLOW AUGERS.

Specification forming part of Letters Patent No. 56,459, dated July 17, 1866.

*To all whom it may concern:*

Be it known that I, J. H. SMITH, of Pineville, in the county of Bucks and State of Pennsylvania, have invented a new and Improved Hollow Auger; and I do hereby declare that the following is a full, clear, and exact description thereof, which will enable those skilled in the art to make and use the same, reference being had to the accompanying drawings, forming part of this specification, in which—

Figure 1 is a perspective view of my invention; Fig. 2, an end view of the same; Fig. 3, a view of a wrench pertaining to the same.

Similar letters of reference indicate corresponding parts.

This invention relates to a new and improved hollow auger, such as are used for cutting tenons on spokes and for similar purposes.

The invention consists of a frame or stock provided with an adjustable center-rod, two adjustable jaws, operated by a right-and-left screw, and a cutter, all arranged as hereinafter fully shown and described.

A represents a frame or stock, which may be of cast metal and is of T form, as shown clearly in Fig. 1, $a$ being the shank portion, and $b$ the face. In the shank $a$ there is fitted longitudinally and centrally a rod, B, which may be secured at any desired point by a set-screw, C, the outer end of the rod being squared in taper form to fit into the mandrel of a lathe, or into a stock or brace.

On the face portion $b$ of the frame or stock there are placed two jaws, D D', which are secured to the face by bolts E E, the latter passing through the face, which is hollow or has an opening, $c$, in it extending nearly its whole length, the heads $d$ of the bolts being at the inner side of the face, and the screw portions passing into the flanges $e$ of the jaws, so as to hold the latter snugly to the face.

The jaw D has its face side of concave form, as shown at $f$, and the face side of the other jaw, D', is of V form, as shown clearly in Fig. 2, each jaw having a nut, $g$, attached to or formed on it, and in these nuts a right-and-left screw, F, works, the right-hand screw working in one nut and the left-hand screw working in the other, as shown in Figs. 1 and 2. By this arrangement the two jaws D D' may be made to approach and recede from each other simultaneously by turning the screw F.

The jaw D' has a cutter, G, attached to it by a clamp, $h$, said cutter having an oblique cutting-edge, as shown in Fig. 2. This cutter is adjusted so as to cut a tenon of the desired diameter, and the jaws D D' work or rotate around upon the tenon while the same is being cut, serving to steady the tool and insuring perfect work, the inner edge of the cutter G being in line with the face of jaw D'. The rod B serves as a gage to determine or regulate the length of the tenon to be cut.

The advantage of the invention consists in the facility with which the jaws may be adjusted to cut tenons of different diameters, and the impossibility of the jaws casually shifting after being set. The face portion $b$ of the stock or frame is graduated, as shown at $a^{\times}$, Fig. 1, to serve as a gage for adjusting the jaws.

Having thus described my invention, what I claim as new, and desire to secure by Letters Patent, is—

The frame or stock A and the two adjustable jaws D D', operated by the right-and-left screw F, and the cutter G, all constructed and arranged to operate in the manner substantially as and for the purpose herein set forth.

J. H. SMITH.

Witnesses:
J. J. KENTS,
E. W. SLACK.